US008595448B2

(12) United States Patent (10) Patent No.: US 8,595,448 B2
Feng et al. (45) Date of Patent: Nov. 26, 2013

(54) ASYMMETRIC DOUBLE BUFFERING OF BITSTREAM DATA IN A MULTI-CORE PROCESSOR

(75) Inventors: Kuan Feng, Shanghai (CN); Huo Ding Li, Liu Zhou (CN); Xing S H Liu, Shanghai (CN); Rong Yan, Beijing (CN); Yu Yuan, Beijing (CN); Sheng Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 12/177,253

(22) Filed: Jul. 22, 2008

(65) Prior Publication Data

US 2010/0023709 A1 Jan. 28, 2010

(51) Int. Cl.
*G06F 12/08* (2006.01)
(52) U.S. Cl.
USPC .................................. 711/154; 711/E12.001
(58) Field of Classification Search
USPC ......................................................... 711/154
See application file for complete search history.

(56) References Cited

U.S. PATENT DOCUMENTS

| 5,253,053 | A | * | 10/1993 | Chu et al. ................. 375/240.23 |
| 5,748,174 | A | | 5/1998 | Wong |
| 5,878,280 | A | | 3/1999 | Lucht |
| 6,020,920 | A | | 2/2000 | Anderson |
| 6,091,426 | A | | 7/2000 | Hauck |
| 6,301,650 | B1 | | 10/2001 | Satou |
| 6,308,228 | B1 | | 10/2001 | Yocum |
| 7,146,458 | B2 | | 12/2006 | Smirnov |
| 7,286,066 | B1 | | 10/2007 | Ho |
| 7,626,909 | B2 | | 12/2009 | Tachino |
| 7,791,990 | B2 | | 9/2010 | Shieh |
| 2003/0222998 | A1 | | 12/2003 | Yamauchi |
| 2006/0140277 | A1 | | 6/2006 | Ju |
| 2007/0094031 | A1 | | 4/2007 | Chen |
| 2008/0144717 | A1 | | 6/2008 | Zhu |
| 2009/0052542 | A1 | * | 2/2009 | Romanovskiy et al. . 375/240.24 |

OTHER PUBLICATIONS

Huang—"Double Buffer Algorithm", USENIX—The Advanced Computing Systems Association (Mar. 30, 2002).
Li—"Decoding in Joshua: Open Source, Parsing-Based Machine Translation", The Prague Bulletin of Mathematical Linguistics (PBML), No. 91, pp. 47-56 (Jan. 2009).

* cited by examiner

*Primary Examiner* — Kenneth Lo
(74) *Attorney, Agent, or Firm* — Matt Talpis; Mark P Kahler

(57) ABSTRACT

An information handling system includes a multi-core processor that processes variable-length code (VLC) bitstream data. The bitstream data includes multiple codewords for interpretation. The processor includes a general purpose unit (GPU) and a special purpose unit (SPU). The GPU includes GPU buffers and the SPU includes SPU buffers. After populating one GPU buffer with bitstream data, the processor populates another GPU buffer with subsequent bitstream data. The processor may populate the GPU buffers in alternating fashion. The processor populates one SPU buffer with bitstream data while parsing bitstream data in the other SPU buffer. The GPU of the processor populates the SPU buffers in alternating fashion. The size of the GPU buffers may be a multiple of the size of the SPU buffers. After the SPU buffers consume the bitstream data from one GPU buffer, the other GPU buffer transfers its bitstream data to the SPU buffers for parsing.

20 Claims, 5 Drawing Sheets

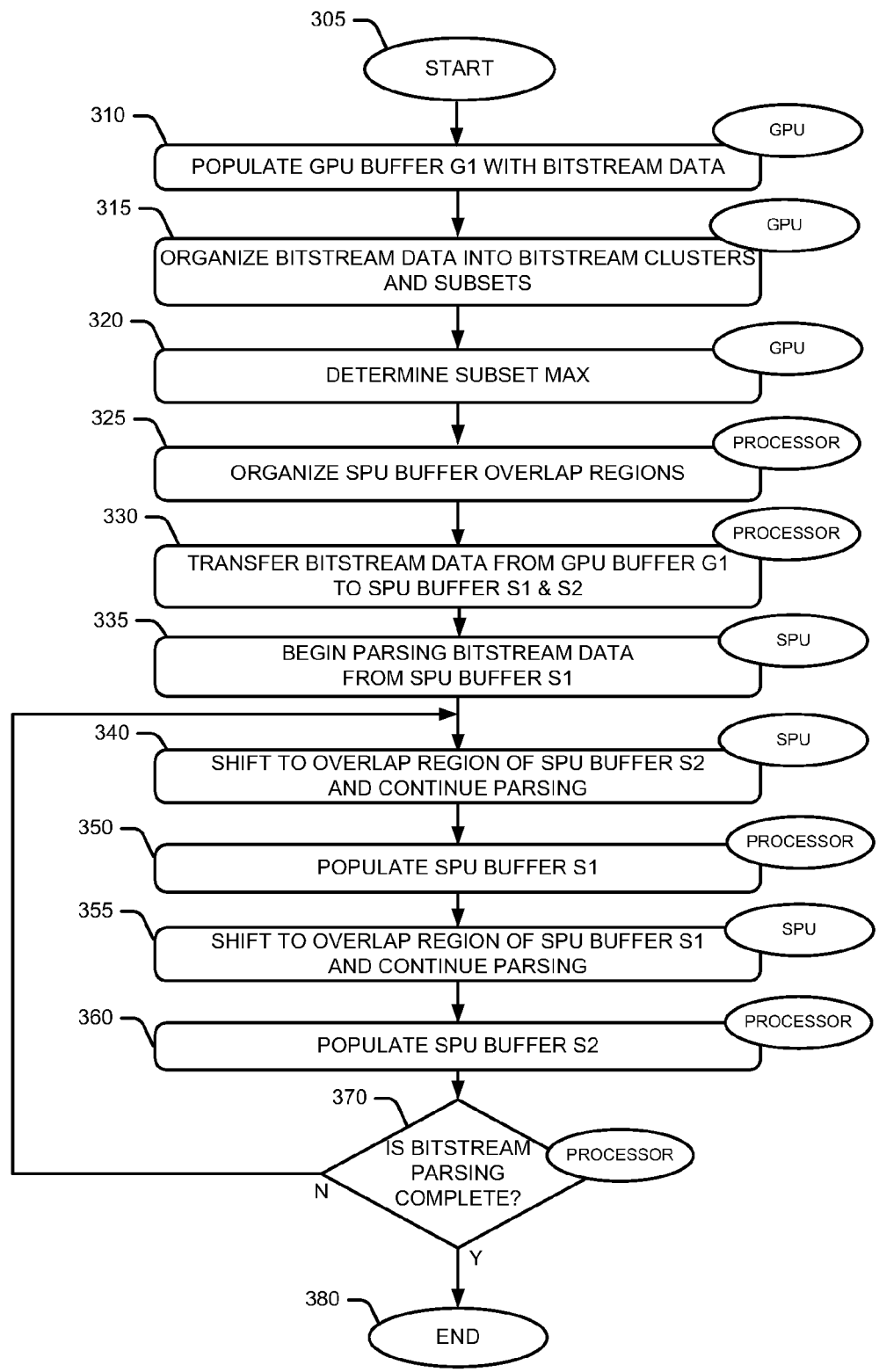

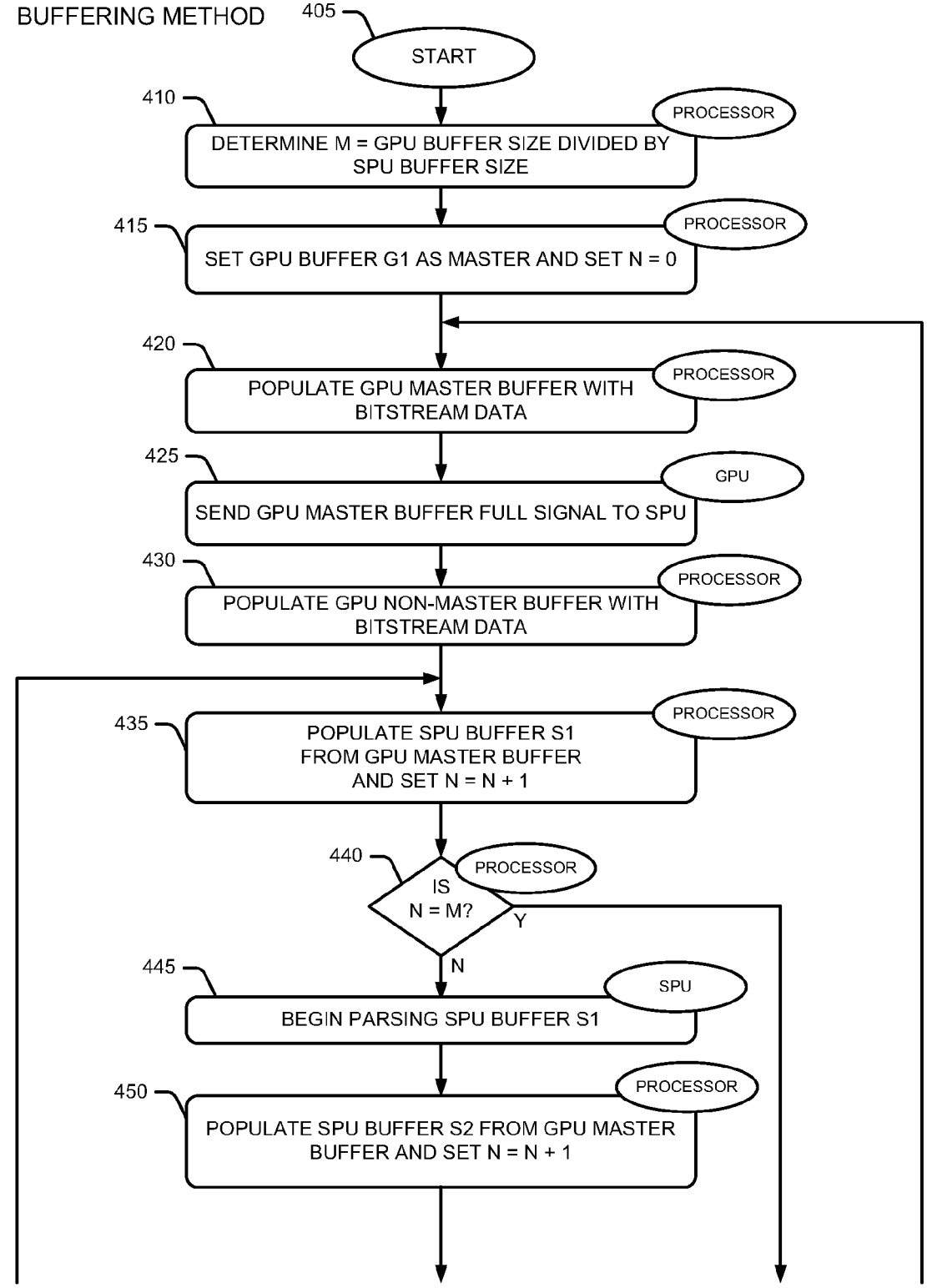

US 8,595,448 B2

ASYMMETRIC DOUBLE BUFFERING OF BITSTREAM DATA IN A MULTI-CORE PROCESSOR

BACKGROUND

The disclosures herein relate generally to processors, and more specifically, to multi-core processors that process bitstream communications in information handling systems.

Modern information handling systems (IHSs) use processors that often generate, interpret, or otherwise manage binary bitstream communications for audio, video or other data forms. Processors may employ fixed-length code (FLC), variable-length code (VLC), or other protocols for the compression and management of binary bitstream data. Multi-core processors employ memory buffers to load and store bitstream data for use by processors of the IHS during parsing and other operations. Buffer memory use is a contributing factor to bitstream decoding efficiency.

BRIEF SUMMARY

Accordingly, in one embodiment, a method of parsing a variable-length code (VLC) bitstream including bitstream data includes providing a general purpose unit (GPU) with first and second GPU buffers exhibiting a buffer size. The method also includes providing a special purpose unit (SPU) with first and second SPU buffers that exhibit a buffer size, the first GPU buffer exhibiting a buffer size that is M times the size of the first SPU buffer, wherein M is an integer. The method further includes populating the first GPU buffer with VLC bitstream data until completion of population thereof. The method still further includes populating, by the first GPU buffer, the first SPU buffer and the second SPU buffer in alternating fashion with VLC bitstream data in response to completion of population of the first GPU buffer with VLC bitstream data. The method also includes populating the second GPU buffer with VLC bitstream data until completion of population thereof. The method also includes populating, by the second GPU buffer, the first SPU buffer and the second SPU buffer in alternating fashion with VLC bitstream data in response to completion of population of the second GPU buffer with VLC bitstream data.

In another embodiment, a multi-core processor includes a general purpose unit (GPU) that receives a variable-length code VLC bitstream including data, the GPU including first and second GPU buffers that exhibit a buffer size. The processor also includes a special purpose unit (SPU), coupled to the general purpose unit (GPU), that receives the VLC bitstream from the GPU, the SPU including first and second SPU buffers that exhibit a buffer size, the first GPU buffer exhibiting a buffer size that is M times the size of the first SPU buffer, wherein M is an integer. The processor is configured to populate the first GPU buffer with VLC bitstream data until completion of population thereof. The processor is also configured such that the first GPU buffer populates the first SPU buffer and the second SPU buffer in alternating fashion with VLC bitstream data in response to completion of population of the first GPU buffer with VLC bitstream data. The processor is further configured to populate the second GPU buffer with VLC bitstream data until completion of population thereof. The processor is also configured such that the second GPU buffer populates the first SPU buffer and the second SPU buffer in alternating fashion with VLC bitstream data in response to completion of population of the second GPU buffer with VLC bitstream data.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 is a flowchart that shows process flow in the processor of FIG. 2 as it employs the disclosed VLC bitstream parsing method.

FIGS. 4A-4B depict a flowchart that shows process flow in the processor of FIG. 2 as it employs the disclosed double buffering parsing method.

DETAILED DESCRIPTION

The disclosed method and apparatus for decoding a variable bit length code (VLC) bitstream may employ a heterogeneous, multi-core processor. The heterogeneous multi-core processor may use memory cache, memory buffer, or other memory to temporarily store bitstream data. The heterogeneous processor includes a general purpose unit (GPU) to manage data communications from a bitstream source to a synergistic processor unit (SPU). In binary bitstream management, one codeword or binary code syntax may possibly split or reside partially across multiple buffers. The processor may organize the binary bitstream codewords into functionally common subsets. An SPU may take on the responsibility of binary bitstream parsing to decode the binary bitstream data into codeword information. In one embodiment, the SPU may include two buffers. The processor organizes SPU buffer sizes to include overlap regions to allow a full subset of bitstream data to reside in the two SPU buffers. As the SPU parses bitstream data in the first of the two SPU buffers, and encounters a subset boundary in the overlap region, the SPU shifts parsing to the second SPU buffer in an overlap region that is identical to the overlap region of the first SPU buffer. In this manner bitstream parsing does not encounter a codeword split between these two SPU buffers. A codeword split is a situation wherein the codeword is partially in one SPU buffer and partially in the other SPU buffer.

The disclosed information handling system (IHS) may include a multi-core processor that performs asymmetric double buffering processing on variable-length code (VLC) bitstream data. A variable-length code (VLC) may map source symbols to a number of bits that varies. The bitstream data includes encoded data with multiple codewords or binary code syntax that needs decoding and interpretation. A general purpose unit (GPU) includes multiple GPU buffers for bitstream data storage. After the GPU populates a first GPU buffer from a bitstream source, the GPU begins populating the second GPU buffer from the bitstream data. The GPU transfers the binary bitstream data to a synergistic processor unit (SPU) that begins parsing or decoding operations. The SPU includes first and second SPU buffers. The processor determines a magnitude or count of GPU buffer to SPU buffer size and maintains a count of SPU buffer fills. When the two SPU buffers together populate to a number of fills corresponding to a total bitstream size equal to one GPU buffer size, transfer shifts to the other GPU buffer as the SPU buffer data source. The GPU populates one SPU buffer while parsing commences in the other SPU buffer. When one SPU buffer begins parsing, GPU data populates the other SPU buffer and then this sequence repeats. In this manner, the multi-core processor processes a bitstream data that includes variable length codes. In one embodiment, the processor may include more than 2 SPUs.

Figure 1:
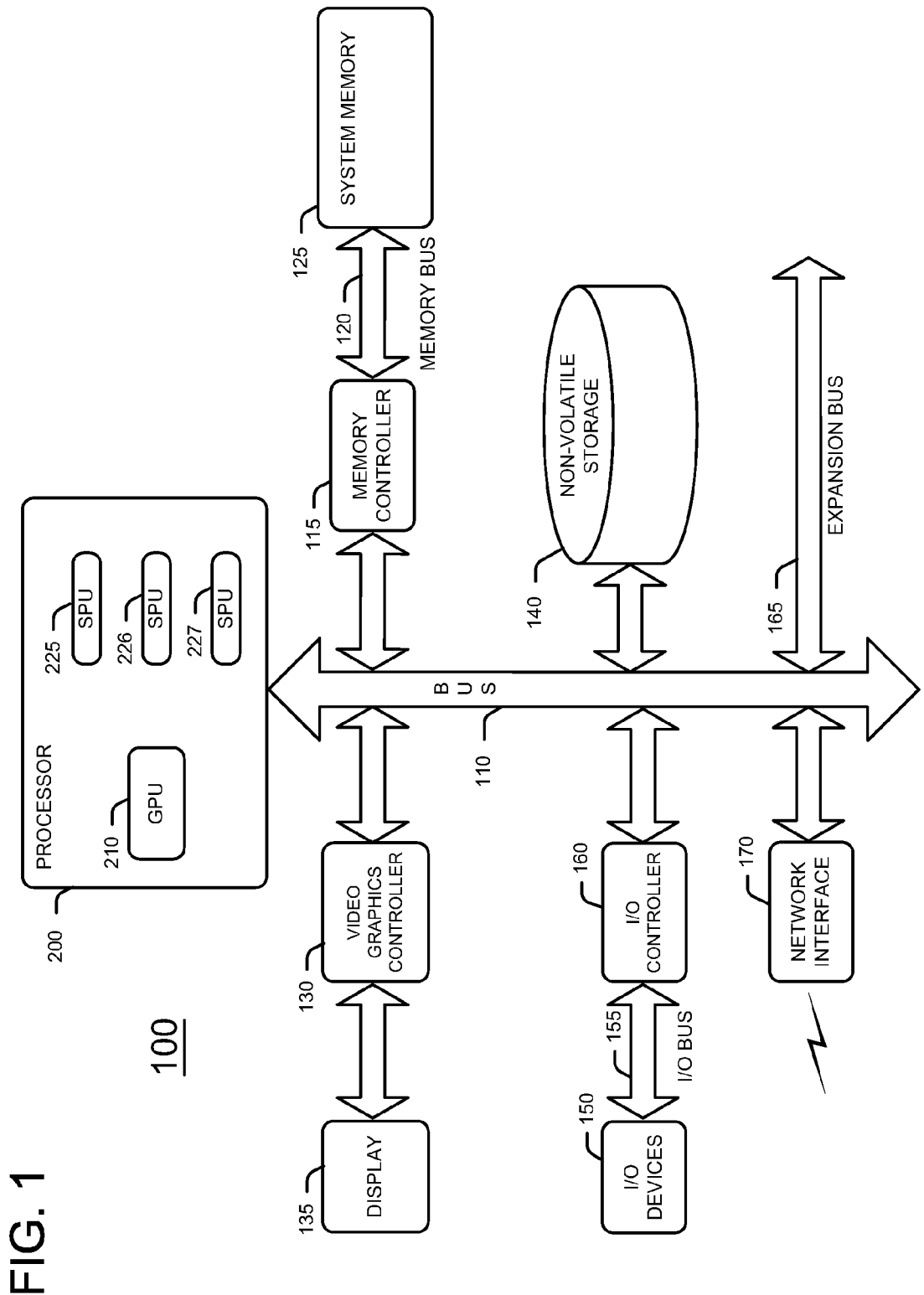
FIG. 1 is block diagram of an information handling system (IHS) that includes the disclosed variable-length code (VLC) bitstream parsing methodology.

FIG. 1 shows an information handling system (IHS) 100 that may employ the disclosed VLC bitstream parsing method. IHS 100 includes a heterogeneous processor 200 that couples to a bus 110. Processor 200 includes a general purpose unit or core 210 and a number of special purpose or synergistic processor units (SPUs) such as cores 225, 226 and 227. A memory controller 115 couples to bus 110. A memory bus 120 couples system memory 125 to memory controller 115. A video graphics controller 130 couples display 135 to bus 110. IHS 100 includes nonvolatile storage 140, such as a hard disk drive, CD drive, DVD drive, or other nonvolatile storage that couples to bus 110 to provide IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA, SATA, eSATA, PCI, PCIE and other busses, couple to bus 110 to facilitate the connection of peripherals and devices to IHS 100. A network interface 170 couples to bus 110 to enable IHS 100 to connect by wire or wirelessly to other network devices. IHS 100 may take many forms. For example, IHS 100 may take the form of a desktop, server, portable, laptop, notebook, or other form factor computer or data processing system. IHS 100 may also take other form factors such as a personal digital assistant (PDA), a gaming device, a portable telephone device, a communication device or other devices that include a processor and memory.

Figure 2:
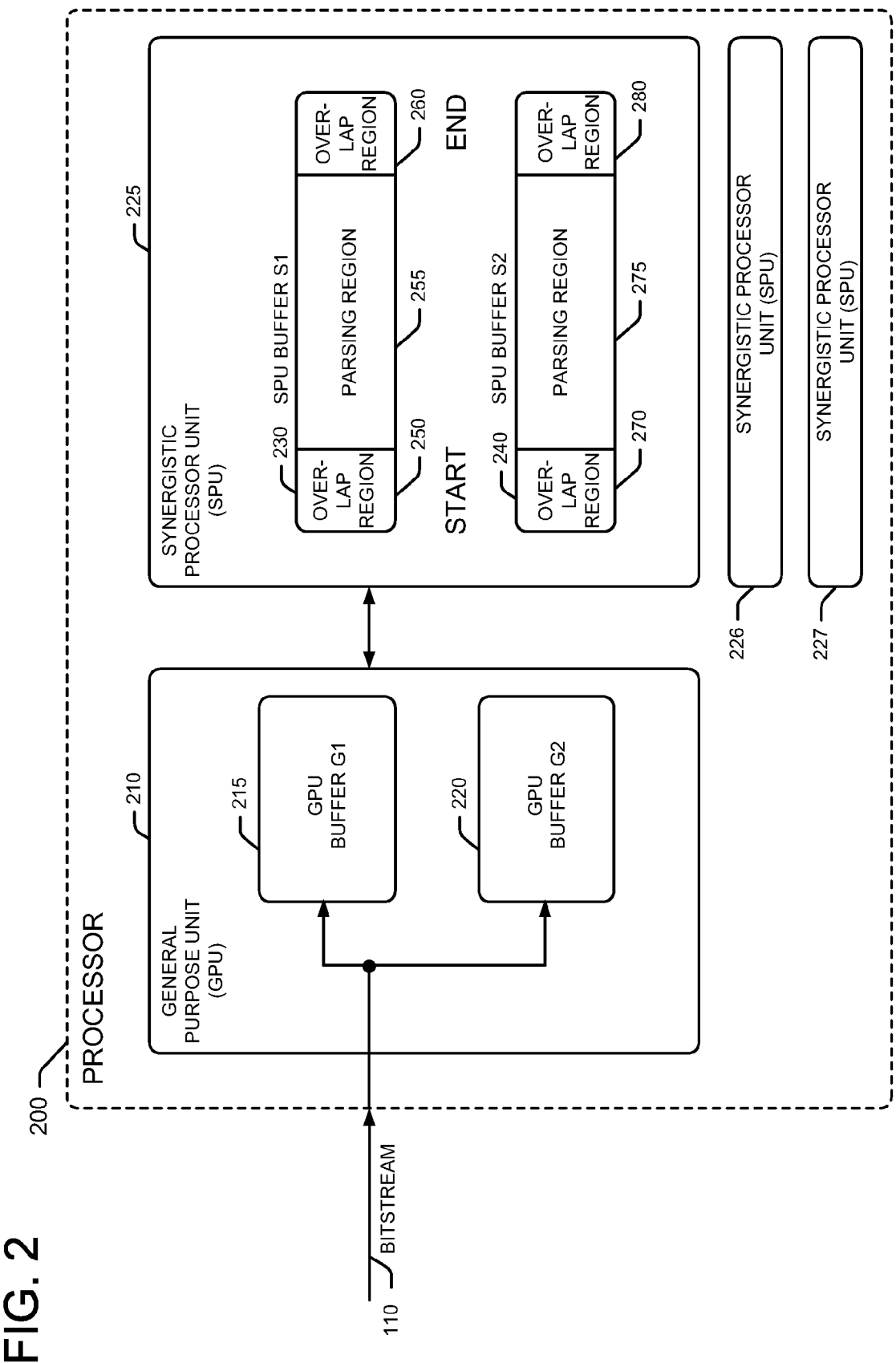
FIG. 2 shows more detail of the multi-core processor employing the VLC bitstream parsing method.

FIG. 2 depicts a representative multi-core processor 200. Processor 200 includes general purpose unit (GPU) 210 and synergistic processor units (SPUs) 225, 226 and 227 of which SPU 225 is shown in more detail. Bus 110 of IHS 100 couples to processor 200 to provide a binary bitstream data source thereto. The binary bitstream data may originate in non-volatile storage 140, network interface 170, expansion bus 165, or other source of IHS 100. Bus 110 couples to general processor unit (GPU) 210 and more specifically to a GPU buffer G1 215 and a GPU buffer G2 220. GPU 210 couples to a synergistic processor unit (SPU) 225. SPU 225 employs SPU buffer S1 230 and SPU buffer S2 240 for bitstream storage and analysis.

In one embodiment, the primary mechanism for bitstream parsing or decoding in processor 200 is a sequential production of syntaxes from binary bitstream data. A syntax is a codeword, namely a combination of binary bits in the bitstream. The syntaxes occur in the bitstream with a probability and bit length that are unknown prior to parsing or decoding of the bitstream. To avoid read/write bitstream data buffer overflow, processor 200 determines the current bitstream position of each parsing, namely each syntax processing. GPU 210, or the main processor of processor 200, employs a larger buffer memory than SPU 225 employs. In other words, GPU buffer G1 215 is a multiple in size of SPU buffer S1 230. In one embodiment, GPU buffer G1 215 is M times larger than SPU buffer S1 230, wherein M is an integer. In the example of FIG. 2, GPU buffer G1 215 may be equal in memory size to GPU buffer G2 220. SPU buffer S1 230 may be equal in size to SPU buffer S2 and smaller than GPU buffer G1 215.

The disclosed asymmetric double buffering methodology involves the difference in memory size between the buffers of GPU 210 and the buffers of SPU 225 and the transfer of bitstream data between this GPU and SPU. Processor 200 may organize SPU buffer S1 230 and SPU buffer S2 240 with an overlap region identical between these two buffers. For example, SPU buffer S1 230 may include an overlap region 250 at the start or top of the SPU 230 buffer S1 memory as seen in FIG. 2. That overlap region 250 is adjacent to a parsing region 255 which is adjacent to another overlap region 260 at the end or bottom of SPU buffer S1 230. SPU buffer S2 240 includes an overlap region 270 at the start of the SPU 240 buffer S2 memory. That overlap region 270 is adjacent to a parsing region 275 which is adjacent to another overlap region 280 at the end of SPU buffer S2 240.

Initially, GPU 210 sends bitstream data to SPU buffer S1 230 and populates all regions including overlap region 250, parsing region 255, and overlap region 260. When GPU 210 sends bitstream data to SPU buffer S2 240, GPU 210 copies the bitstream data residing in overlap region 260 in SPU buffer 51 230 into overlap region 270 in SPU buffer S2 240. In other words, overlap region 260 and overlap region 270 store the same content from the bitstream data. In this manner, while SPU 225 parses the data in its SPU buffer S1 230, processor 200 may move or switch from sending data to SPU buffer S1 230 to sending data to SPU buffer S2 240 without dealing with end-of-buffer or buffer overflow issues. Moreover, during parsing, processor 200 does not encounter mid syntax, or binary bitstream syntax data that span between SPU buffer S1 230 and SPU buffer S2 240. The content of overlap region 280 of SPU S2 240 is identical to the content of overlap region 250 of SPU S1 230.

In more detail with respect to asymmetric double, double buffering, bitstream 110 fills GPU buffer G1 215 with data. GPU buffer G1 215 exhibits a memory size M times the memory size of SPU buffers S1 230 and S2 240. GPU buffer G1 215 sends its bitstream data in alternating fashion to SPU buffers 51 230 and S2 240. In other words, GPU buffer G1 215 sends its data to SPU buffer 51 230 until SPU buffer S1 230 fills and then sends subsequent data to SPU buffer S2 240 until SPU buffer S2 240 fills. At this point in time, SPU buffer S1 230 and SPU buffer S2 240 each exhibit one data fill.

While SPU buffer S2 240 fills with data, SPU 225 parses or decodes the bitstream data in SPU buffer S1 230. Conversely, while SPU buffer S1 230 refills with new bitstream data from GPU buffer G1, SPU 225 parses the bitstream data in SPU buffer S2 240. GPU buffer G1 continues refilling SPU buffer S1 and SPU buffer S2 in this alternating fashion until completion or transfer of the full contents of GPU buffer G1 215 to SPU buffer S1 230 and SPU buffer S2 240. After completion of this data transfer from GPU buffer G1 215 to SPU 225, GPU G2 220 commences transmission of its data contents to the SPU buffers S1 and S2 in substantially the same alternating fashion as described above with respect to GPU buffer G1 215. When GPU buffer G2 220 completes the transfer of its data contents to SPU buffers S1 and S2, GPU buffer G1 215 commences transfer of its new bitstream data contents to SPU buffers S1 and S2. GPU buffer G1 215 and GPU buffer G2 continue transferring their new data from the bitstream in this alternating fashion to the buffers of SPU 225.

As described above, GPU buffer G1 215 fills SPU buffer S1 230 and SPU buffer S2 240 in alternating fashion until GPU buffer G1 215 transfers all of its contents to SPU buffer S1 230 and SPU buffer S2 240 for processing. One way in which processor 200 determines completion of transfer of the contents of GPU buffer G1 215 is by tracking the cumulative total number of fills of SPU buffer S1 and SPU buffer S2. For example, assume that SPU buffer S1 exhibits a 1 KB size, SPU buffer S2 exhibits a 1 KB size, and GPU buffer G1 exhibits a 10 KB size. In this scenario, 10 cumulative fills between SPU buffer S1 and S2, in alternating fashion, will complete the transfer of the data contents of GPU buffer G1 to SPU buffer S1 and S2 of SPU 225. Processor 200 counts the cumulative total number of fills of SPU buffers S1 and S2. When the count reaches 10, processor 200 knows that the data content transfer from GPU buffer G1 to SPU buffer S1 and S2 is complete. When this occurs, GPU buffer G2 commences data transfer to SPU buffers S1 and S2, while GPU buffer G1 refills with new data from the bitstream. Processor 200 thus provides asymmetric double, double buffering to the encoded bitstream 110. This buffering is asymmetric in the sense that the size of a GPU buffer, which acts as a data source, is larger than the size of an SPU buffer, which acts as a temporary data destination. For example, in the embodiment above, the size of the GPU buffer 215 is M times the size of the SPU buffer 230.

In more detail with respect to the overlap regions of SPU buffer S1 230 and SPU buffer S2 240, GPU 210 populates SPU buffers S1 and S2 in the following manner. In one embodiment, GPU buffer G1 215 populates SPU buffer S1 230 with bitstream data starting at START and ending at END of SPU buffer 230, as seen in FIG. 2. More particularly, GPU G1 215 populates overlap region 250 with bitstream data and then populates parsing region 255 with bitstream data. Upon completion of populating parsing region 255 with data, GPU buffer G1 215 populates overlap region 260 with bitstream data.

GPU buffer G1 215 populates overlap region 270 of SPU buffer S2 240 with the same bitstream data as overlap region 260 of SPU buffer S1 230. The designer selects the size of overlap regions 260 and 270 to be sufficiently large as to prevent buffers S1 and S2 from splitting data in the middle of a codeword of the bitstream data during parsing. For example, when the size of GPU buffer G1 215 is 2 MB and the size of SPU buffer S1 230 is 16 KB, overlap region 250 may exhibit a 1 KB size. The GPU buffers, SPU buffer and overlap regions may exhibit other sizes than those given in this example depending on the particular application. The bitstream data includes subsets that are complete sets of codewords. The designer selects the size of overlap regions 260 and 270 to be sufficiently large to include at least one full subset of bitstream data. After overlap region 270 populates with bitstream data, GPU buffer G1 215 populates parsing region 275 with bitstream data and then populates overlap region 280 with bitstream data. After population of overlap region 280 completes, GPU buffer G1 215 again starts populating SPU buffer S1 230 with bitstream data starting at overlap region 250. GPU buffer G1 215 populates overlap region 250 of SPU buffer S1 with the same bitstream content as overlap region 280 of SPU buffer S2. GPU buffer G1 continues populating SPU buffer S1 230 and SPU buffer S2 240 in alternating fashion as described above until the cumulative total number of SPU buffer fills equals M. After M SPU buffer fills cumulatively between SPU buffers S1 and S2, transfer of the contents of GPU buffer G1 215 to the SPU buffers of SPU 225 is complete. During these fill operations, while one of SPU buffers S1 and S2 fills with information, SPU 225 parses or decodes the contents of the other of the SPU buffers in alternating fashion. In the above embodiment, the designer selects the size of overlap region 250-280 to be sufficiently large as to prevent buffers S1 and S2 from splitting data in the middle of a codeword of the bitstream data during parsing. In practice, the size of overlap regions 250, 260, 270 and 280 may all be the same size.

FIG. 3 shows a flowchart that describes one example of the disclosed multi-core processor bitstream parsing method that employs overlap regions in SPU buffers. The multi-core processor bitstream parsing method begins, as per block 305. GPU 210 populates GPU buffer G1 215 with bitstream data, as per block 310. IHS 100 bus 110 provides bitstream data, such as VLC binary bitstream data in the form of binary syntax information to GPU 210. GPU 210 organizes the bitstream data into subsets, or clusters of syntax information, as per block 315. GPU 210 analyses the bitstream data and determines bitstream subsets that demonstrate attributes of common function. For example, GPU 210 may classify the bitstream data by the macro-block level and the syntaxes in each subset contribute to the parsing of one macro-block. GPU 210 determines "subset max", as per block 320. Subset max is the largest memory size or largest subset of bitstream information in GPU 210.

Processor 200 organizes SPU buffer S1 230 and SPU buffer S2 240 overlap regions 250, 260, 270 and 280, as per block 325. For example, processor 200 may organize overlap regions 250, 260, 270 and 280 as equal to the subset max value that GPU 210 determines above. Processor 200 transfers bitstream data from GPU buffer G1 to SPU buffer S1 230 and SPU buffer S2 240, as per block 330. In one example, the bitstream data begins at the start of parsing region 255 of SPU buffer S1 230. In that case, the overlap region 260 of SPU buffer S1 230 includes the same data as the overlap region 270 of SPU buffer S2 240. This assumes previous population of SPU buffer S2 by GPU buffer G1. With the population of SPU buffer S1 230 and SPU buffer S2 240 complete, parsing may now begin. SPU 225 begins parsing of SPU buffer S1 230 data, as per block 335. In one example, parsing begins at the start of parsing region 255 and proceeds into overlap region 260 of SPU buffer S1 230. When SPU 225 reaches a transition between subsets within overlap region 260, parsing shifts to the identical information in overlap region 270 of SPU buffer S2 240, and parsing continues, as per block 340.

While SPU 225 is parsing bitstream data in SPU buffer S2 240, SPU buffer S1 230 is idle and available for populating. Processor 200 populates SPU buffer S1 230, as per block 350. Processor 200 populates SPU buffer S1 230 with the next sequence of subsets in the bitstream data of GPU buffer G1 215. As SPU 225 continues parsing the bitstream data of SPU buffer S2 240, the parsing moves from overlap region 270 into parsing region 275. After the parsing of parsing region 275 SPU buffer S2 240, parsing moves to the overlap region 280. When parsing reaches a subset boundary or transition between subsets within overlap region 280, parsing shifts to the identical information in overlap region 250 of SPU buffer S1 230 and parsing continues, as per block 355. While SPU 225 is parsing SPU buffer S1 230, processor 200 populates SPU buffer S2 240, as per block 360. The disclosed method describes a continuous process of parsing one buffer of SPU 225 while populating the other buffer of SPU 225, until the bitstream data ends, stalls, or otherwise completes. Processor 200 performs a test to determine if the bitstream parsing is complete, as per block 370. If the bitstream parsing is not complete, SPU 225 shifts to overlap region 270 of SPU buffer S2 240, and parsing continues again, as per block 340. However, if the bitstream parsing is complete, the multi-core processor bitstream parsing method ends, as per block 380.

Figure 4B:
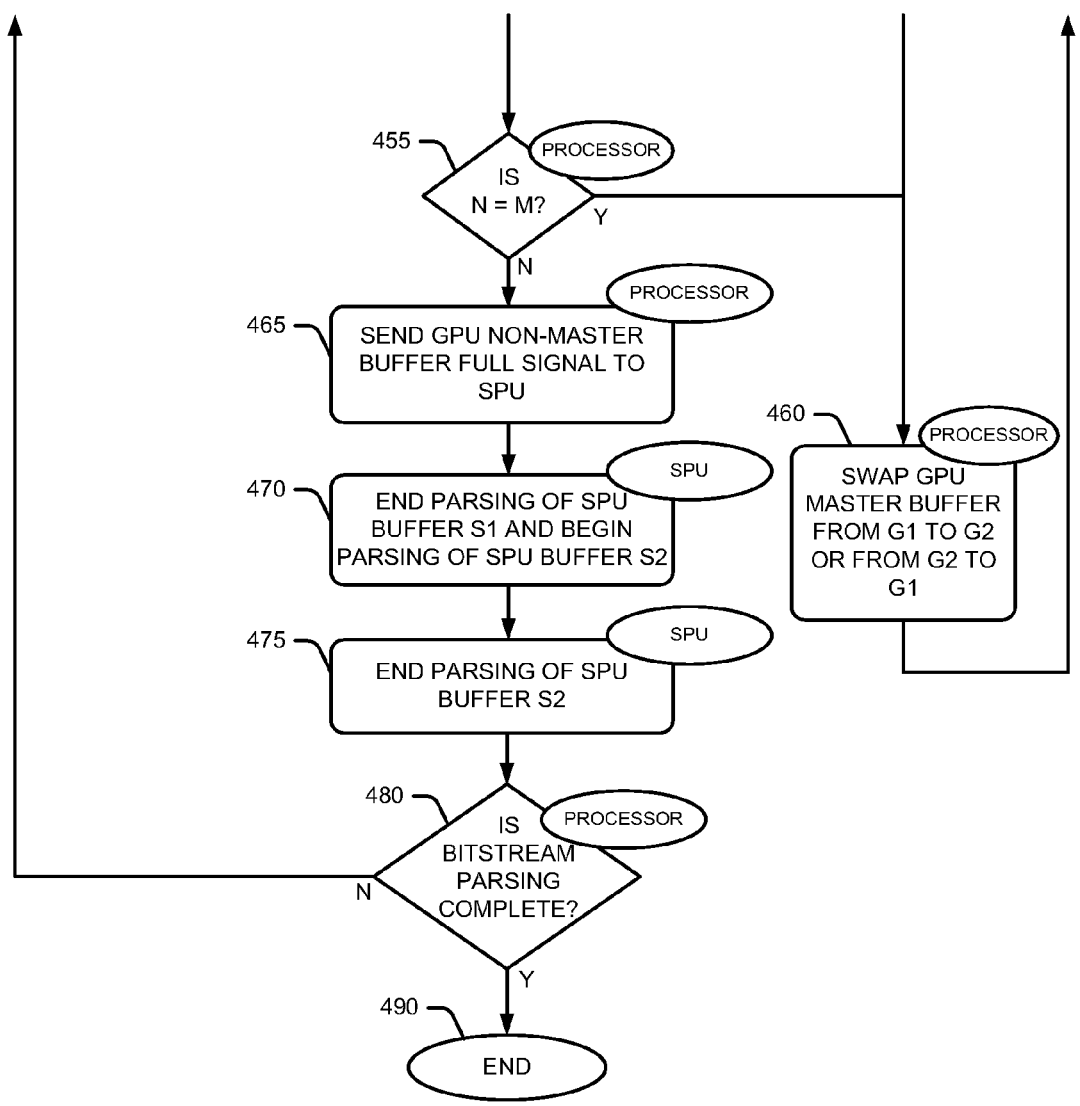

FIGS. 4A-4B depict a flowchart describing one example of the disclosed bitstream double, double buffering method. The asymmetric double, double buffering method starts, as per block 405. Processor 200 determines the value of M (wherein M=GPU buffer G1 215 size divided by SPU buffer S1 230 size), as per block 410. M is the numerical count of SPU 225 buffers that fit within the memory size of a GPU 210 buffer. Processor 200 sets GPU buffer G1 215 as master and integer N equal to 0, as per block 415. Processor 200 populates GPU master buffer, namely GPU buffer G1 215, initially with bitstream data, as per block 420. IHS 100 bus 110 provides binary bitstream data, such as VLC bitstream data to GPU 210, and more particularly to GPU buffer G1 215. After the GPU master buffer is full of bitstream information, GPU 210 sends a GPU master buffer full signal to SPU 225, as per block 425. By GPU 210 sending the GPU master buffer full signal, SPU 225 prepares for bitstream population of SPU 225 buffers. Processor 200 populates the non-master GPU buffer, either GPU buffer G1 215 or GPU buffer G2 220, with bitstream data, as per block 430.

Processor 200 populates SPU buffer S1 230 from GPU master buffer data and sets N=N+1, as per block 435. Processor 200 performs a test to determine if N=M, as per block 440. That test will determine if GPU 210 transferred the entire contents of the GPU master buffer to SPU 225 buffers. If N is not equal to M, the GPU master buffer is not empty, and SPU 225 begins parsing the bitstream data in SPU buffer S1 230, as per block 445. While SPU buffer S1 230 is busy parsing, processor 200 populates SPU buffer S2 240 from GPU master buffer bitstream data and sets N=N+1, as per block 450. Processor 200 performs a test to determine if N=M, as per block 455. If the test per blocks 440 or 455 determine that N=M is true, processor 200 swaps the designation of GPU master buffer from GPU buffer G1 215 to GPU buffer G2 220 or GPU buffer G2 220 to GPU buffer G1 215, as per block 460. The GPU master buffer swap toggles from the current GPU master buffer to the current GPU non-master buffer. If N is not equal to M, processor 200 sends a GPU non-master buffer full signal to SPU 225, as per block 465.

SPU 225 ends parsing of SPU buffer S1 230 and begins the parsing of SPU buffer S2 240, as per block 470. SPU 225 may begin the parsing of SPU buffer S2 240 after the parsing of SPU buffer S1 230 reaches a subset boundary. In that case the parsing of SPU buffer S2 240 will begin at the same bitstream data point as left off at SPU buffer S1 230. That bitstream data point may be within the overlap region 260 of SPU buffer S1 230 and the identical data area, or overlap region 270 of SPU buffer S2 240. Parsing ends within SPU 225 for the bitstream data of SPU buffer S1 230, as per block 475.

The disclosed method describes a continuous process of parsing one buffer of SPU 225 while populating the other buffer of SPU 225, as well as populating one buffer of GPU 210 while using the data from the other GPU 210 buffer for data transfers to SPU 225. Once one GPU 210 buffer is empty, operations move immediately to the second GPU buffer which then becomes the GPU master buffer. Processor 200 performs a test to determine if bitstream parsing is complete, as per block 480. If the bitstream parsing is not complete, processor 200 populates SPU buffer S1 230 from GPU master buffer data, sets N=N+1, and flow continues again, as per block 435. However, if the bitstream parsing is complete, the asymmetric double buffering method ends, as per block 490.

The foregoing discloses methodologies wherein a processor may employ GPU and SPU buffers to receive, analyze, parse and otherwise manage VLC or other binary bitstream data. A processor within an IHS may employ processor memory, cache or other storage of binary bitstream codeword data that the IHS and processor receive as input.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium. Moreover, the present invention may be practiced in an emulator hardware, emulator software, or simulator form.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of parsing a variable-length code (VLC) bitstream including bitstream data, comprising:
providing a general purpose unit (GPU) with first and second GPU buffers exhibiting a buffer size;
providing a special purpose unit (SPU) with first and second SPU buffers that exhibit a buffer size, the first GPU buffer and the second GPU buffer each exhibiting a buffer size that is M times the size of the first SPU buffer, wherein M is an integer;
populating the first GPU buffer with VLC bitstream data until completion of population thereof;
populating the second GPU buffer with VLC bitstream data until completion of population thereof;
populating, by the first GPU buffer, the first SPU buffer and the second SPU buffer in alternating fashion with VLC bitstream data, wherein the populating, by the first GPU buffer, the first SPU buffer and the second SPU buffer in alternating fashion with VLC bitstream data continues until a cumulative total number of fills of the first and second SPU buffers equals M;
populating, by the second GPU buffer, the first SPU buffer and the second SPU buffer in alternating fashion with VLC bitstream data, wherein the populating, by the second GPU buffer, the first SPU buffer and the second SPU buffer in alternating fashion with VLC bitstream data continues until a cumulative total number of fills of the first and second SPU buffers equals M; and
decoding, by the SPU, VLC bitstream data in the first SPU buffer while the second SPU buffer populates with VLC bitstream data and decoding, by the SPU, VLC bitstream data in the second SPU buffer while the first SPU buffer populates with VLC bitstream data.

2. The method of claim 1, wherein the populating the second GPU buffer with VLC bitstream data until completion of population thereof occurs during populating, by the first GPU buffer, the first SPU buffer and the second SPU buffer in alternating fashion with VLC bitstream data.

3. The method of claim 1, further comprising repeating populating of the first GPU buffer with VLC bitstream data during populating, by the second GPU buffer, the first SPU buffer and the second SPU buffer in alternating fashion with VLC bitstream data.

4. The method of claim 1, wherein the populating, by the first GPU buffer, the first SPU buffer and the second SPU buffer in alternating fashion with VLC bitstream data occurs until a cumulative total number of fills of the first and second SPU buffers equals M.

5. The method of claim 4, wherein the SPU parses the bitstream data of the first SPU buffer while the second SPU buffer populates with bitstream data.

6. The method of claim 5, wherein the SPU parses the bitstream data of the second SPU buffer while the first SPU buffer populates with bitstream data.

7. The method of claim 1, wherein the first and second SPU buffers each exhibit the same buffer size.

8. The method of claim 7, wherein the first and second GPU buffers each exhibit the same buffer size.

9. A multi-core processor, comprising:
a general purpose unit (GPU) that receives a variable-length code VLC bitstream including data, the GPU including first and second GPU buffers that exhibit a buffer size; and
a special purpose unit (SPU), coupled to the general purpose unit (GPU), that receives the VLC bitstream from the GPU, the SPU including first and second SPU buffers that exhibit a buffer size, the first GPU buffer and the second GPU buffer each exhibiting a buffer size that is M times the size of the first SPU buffer, wherein M is an integer;
the processor being configured to populate the first GPU buffer with VLC bitstream data until completion of population thereof;
the processor being further configured to populate the second GPU buffer with VLC bitstream data until completion of population thereof;
the processor also being configured such that the first GPU buffer populates the first SPU buffer and the second SPU buffer in alternating fashion with VLC bitstream data, such that first GPU buffer continues populating the first SPU buffer and the second SPU buffer in alternating fashion with VLC bitstream data until a cumulative total number of fills of the first and second SPU buffers equals M;
the processor also being configured such that the second GPU buffer populates the first SPU buffer and the second SPU buffer in alternating fashion with VLC bitstream data, such that second GPU buffer continues populating the first SPU buffer and the second SPU buffer in alternating fashion with VLC bitstream data until a cumulative total number of fills of the first and second SPU buffers equals M; and
the processor also being configured such that the SPU decodes VLC bitstream data in the first SPU buffer while the second SPU buffer populates with VLC bitstream data, the processor being further configured such that the SPU decodes VLC bitstream data in the second SPU buffer while the first SPU buffer populates with VLC bitstream data.

10. The processor of claim 9, wherein the processor populates the second GPU buffer with VLC bitstream data while the first GPU buffer populates the first SPU buffer and the second SPU buffer with bitstream data.

11. The processor of claim 9, wherein the processor is configured to populate the first and second SPU buffers in alternating fashion until a cumulative total number of fills of the first and second SPU buffers equals M.

12. The processor of claim 11, wherein the SPU parses the bitstream data of the first SPU buffer while the second SPU buffer populates with bitstream data.

13. The processor of claim 12, wherein the SPU parses the bitstream data of the second SPU buffer while the first SPU buffer populates with bitstream data.

14. The processor of claim 9, wherein the first and second SPU buffers each exhibit the same buffer size.

15. The processor of claim 9, wherein the first and second GPU buffers each exhibit the same buffer size.

16. An information handling system (IHS), the IHS comprising:
a memory;
a multi-core processor, coupled to the memory, the multi-core processor including:
a general purpose unit (GPU) that receives a variable-length code VLC bitstream including data, the GPU including first and second GPU buffers that exhibit a buffer size; and
a special purpose unit (SPU), coupled to the general purpose unit (GPU), that receives the VLC bitstream from the GPU, the SPU including first and second SPU buffers that exhibit a buffer size, the first GPU buffer and the second GPU buffer each exhibiting a buffer size that is M times the size of the first SPU buffer, wherein M is an integer;

the processor being configured to populate the first GPU buffer with VLC bitstream data until completion of population thereof;

the processor being further configured to populate the second GPU buffer with VLC bitstream data until completion of population thereof;

the processor also being configured such that the first GPU buffer populates the first SPU buffer and the second SPU buffer in alternating fashion with VLC bitstream data, such that first GPU buffer continues populating the first SPU buffer and the second SPU buffer in alternating fashion with VLC bitstream data until a cumulative total number of fills of the first and second SPU buffers equals M;

the processor also being configured such that the second GPU buffer populates the first SPU buffer and the second SPU buffer in alternating fashion with VLC bitstream data, such that second GPU buffer continues populating the first SPU buffer and the second SPU buffer in alternating fashion with VLC bitstream data until a cumulative total number of fills of the first and second SPU buffers equals M; and the processor also being configured such that the SPU decodes VLC bitstream data in the first SPU buffer while the second SPU buffer populates with VLC bitstream data, the processor being further configured such that the SPU decodes VLC bitstream data in the second SPU buffer while the first SPU buffer populates with VLC bitstream data.

17. The IHS of claim 16, wherein the processor populates the second GPU buffer with VLC bitstream data while the first GPU buffer populates the first SPU buffer and the second SPU buffer with bitstream data.

18. The IHS of claim 16, wherein the processor is configured to populate the first and second SPU buffers in alternating fashion until a cumulative total number of fills of the first and second SPU buffers equals M.

19. The IHS of claim 18, wherein the SPU parses the bitstream data of the first SPU buffer while the second SPU buffer populates with bitstream data.

20. The IHS of claim 19, wherein the SPU parses the bitstream data of the second SPU buffer while the first SPU buffer populates with bitstream data.

* * * * *